United States Patent
Hauch

(10) Patent No.: US 6,938,357 B2
(45) Date of Patent: Sep. 6, 2005

(54) FORCED AIR CIRCULATION FOR CENTRIFUGAL PELLET DRYER

(75) Inventor: David Hauch, Afton, MN (US)

(73) Assignee: Carter Day International, Inc., Minneapolis, MN (US)

( * ) Notice: Subject to any disclaimer, the term of this patent is extended or adjusted under 35 U.S.C. 154(b) by 7 days.

(21) Appl. No.: 10/658,655

(22) Filed: Sep. 9, 2003

(65) Prior Publication Data

US 2005/0050749 A1 Mar. 10, 2005

(51) Int. Cl.[7] .............................................. F26B 17/12
(52) U.S. Cl. ............................ 34/168; 34/58; 34/593
(58) Field of Search ................................. 210/209, 219; 34/586, 168, 591, 593, 58

(56) References Cited

U.S. PATENT DOCUMENTS

| | | | | |
|---|---|---|---|---|
| 4,565,015 A | * | 1/1986 | Hundley, III | 34/182 |
| 5,265,347 A | * | 11/1993 | Woodson et al. | 34/58 |
| 5,956,858 A | * | 9/1999 | Veal et al. | 34/58 |
| 5,987,769 A | * | 11/1999 | Ackerman et al. | 34/58 |
| 6,063,296 A | * | 5/2000 | Ackerman et al. | 210/767 |
| 6,159,360 A | * | 12/2000 | Gerteis et al. | 210/103 |
| 6,438,866 B1 | * | 8/2002 | Meydell et al. | 34/312 |
| 6,505,416 B2 | * | 1/2003 | Sandford | 34/168 |
| 2002/0014019 A1 | | 2/2002 | Hultsch | |

FOREIGN PATENT DOCUMENTS

WO    WO 00/40911    7/2000

* cited by examiner

Primary Examiner—Cheryl Tyler
Assistant Examiner—Kathryn S. O'Malley
(74) Attorney, Agent, or Firm—Fredrikson & Byron, P.A.

(57) ABSTRACT

An improved centrifugal pellet dryer that employs forced air in the direction opposite that of the pellet travel through the dryer. The air may be preheated depending on the particular product. The resulting airstream reduces water spray and lowers the humidity level of the air in the dryer system. The airstream exits the dryer at or below the lower level of the rotor, thus providing increased exposure to the airflow. The result is enhanced drying effectiveness and increased dryer capacity.

14 Claims, 2 Drawing Sheets

FORCED AIR CIRCULATION FOR CENTRIFUGAL PELLET DRYER

FIELD OF THE INVENTION

This invention relates generally to centrifugal pellet dryers.

BACKGROUND OF THE PRESENT INVENTION

Raw plastics manufacturers produce a liquid product that is extruded in a tubular form from an extruder. The product is extruded under water and then cut into small pieces, tending to form generally spherically shaped particles or beads as it cools. This plastic bead/water slurry is then transported to a dryer to remove the water from the plastic product so that the product can be shipped to other manufacturers to manufacture useful products.

Before shipment, the raw plastic product must be dried. This has been accomplished in the past with the use of centrifugal dryers. Such dryers are known in the art. Typically such dryers force water from the product by striking the water-laden product against a screen, forcing the water through the screen and into a water collection space, thus allowing gravity to drive the water downwardly into a water basket and out of the dryer system through a drain pipe.

These known systems, however, may include a "dried" product that may have an unacceptable level moisture at the end of the process and require further drying to meet the requisite specification. This is due to a significant amount of spray in the water removal space which may result in some water being reintroduced into the product and an increase in the humidity level of the internal dryer air. In general, the known dryer is relatively inefficient and, as a result, has a capacity which may be greatly improved. An improved centrifugal dryer is needed to increase both the drying efficiency and drying capacity.

The present invention accomplishes these goals.

SUMMARY OF THE INVENTION

An improved centrifugal pellet dryer that employs forced air in the direction opposite that of the pellet travel through the dryer. The air may be preheated depending on the particular product. The resulting airstream reduces water spray and lowers the humidity level of the air in the dryer system. The airstream exits the dryer at or below the bottommost level of the rotor, thus providing increased exposure to the airflow. The result is enhanced drying effectiveness and increased dryer capacity.

An object and advantage of the invention is to provide a centrifugal pellet dryer with increased drying efficiency, effectiveness and capacity.

Another object and advantage of the invention is to provide a centrifugal pellet dryer that reduces the waterspray within the dryer and lowers the humidity level in the dryer.

Another object and advantage of the invention is to introduce either ambient or preheated forced dry air into the dryer system to enhance the dryer's effectiveness.

Yet another object and advantage of the invention is to provide exposure of the product to the dry forced air for as long a period as possible to enhance the dryer's effectiveness.

The foregoing objects and advantages of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

With reference to the accompanying Figure, which provides one embodiment of the invention, there is provided an improved centrifugal pellet dryer with increased drying effectiveness, efficiency and capacity.

Figure 1:
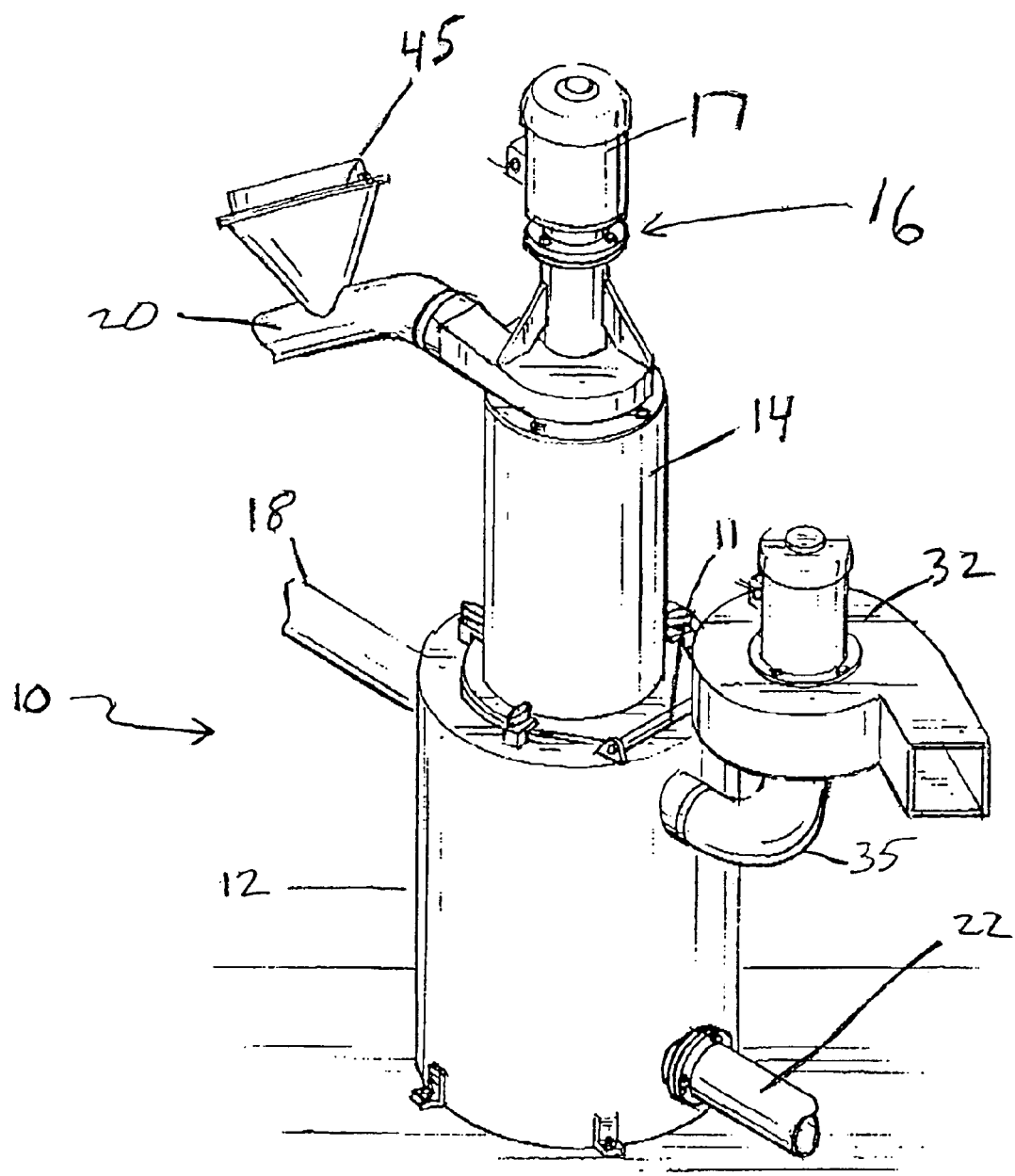
FIG. 1 is a perspective view of the improved centrifugal pellet dryer.
Figure 2:
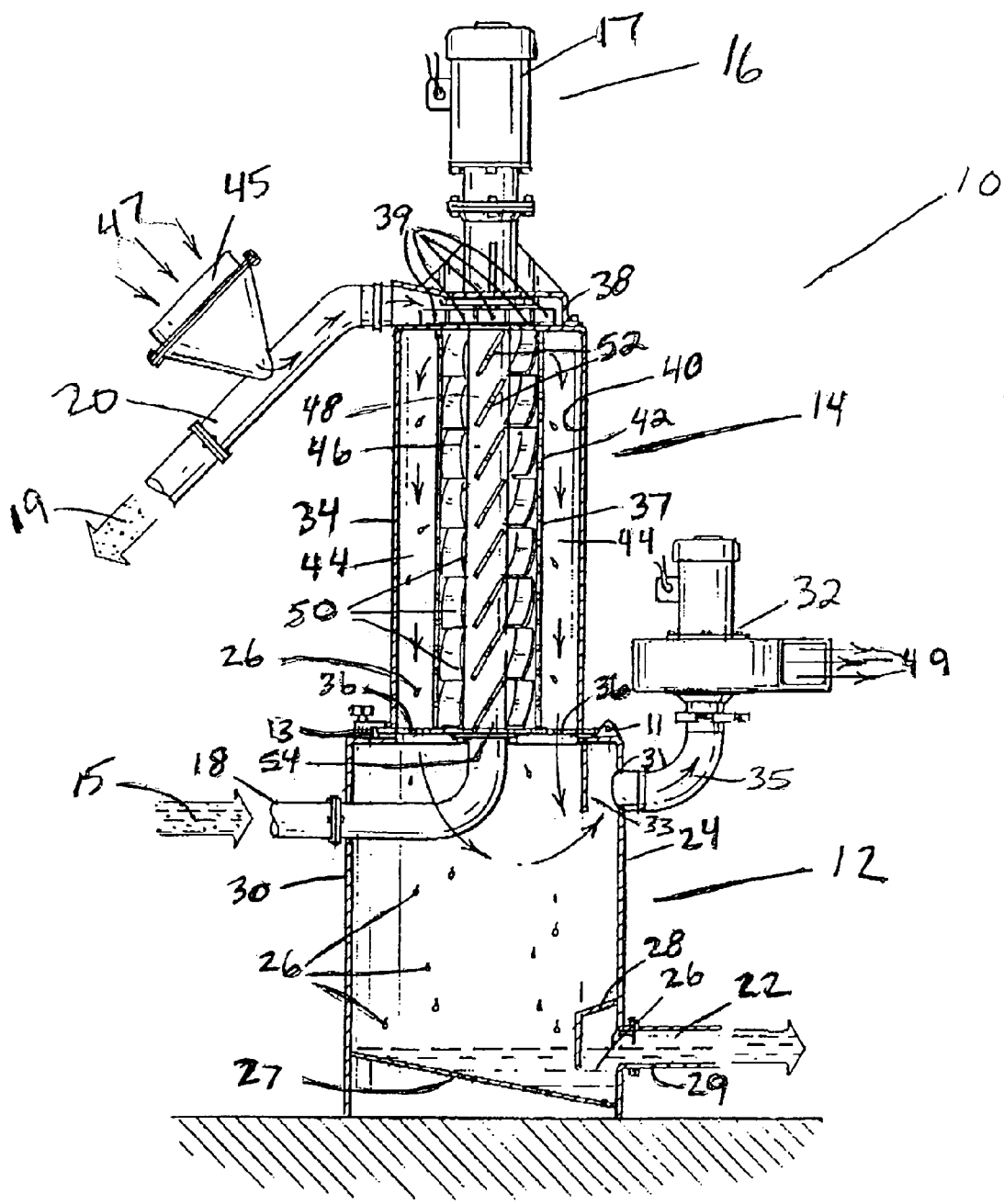
FIG. 2 is a broken away view of the improved centrifugal pellet dryer.

A centrifugal dryer in accord with the present invention 10 is shown in FIGS. 1 and 2. Dryer 10 includes a reservoir section 12, a dryer section 14, and a motor section 16. A product slurry 15, such as a plastic bead or sphere/water mixture, is introduced into the dryer 10 by means of an inlet pipe 18. As best illustrated in FIG. 2, inlet pipe 18 introduces the product slurry into the center of the dryer section 14 and along the axis of rotation of the rotor 46. The center inlet for the slurry 15 provides additional suction and capacity, making the operation of the motor more efficient and providing a more efficient initial water discharge from the product. Dried product 19 is removed from the dryer 10 through a product discharge chute 20 while water removed from the dried product 19 is removed from the reservoir section 12 through a water outlet pipe 22.

It will be observed in FIG. 2 that the reservoir section 12 comprises a reservoir tank 24 for holding, at least temporarily, water 26 removed from the product during the drying process. The water 26 may be removed from the tank 24 through the water discharge pipe 22 and recycled for further use in the product slurry or cleaned as necessary and discharged back into the available sewage system. Tank 24 may include a sloped bottom 27 to facilitate removal of water or other materials from the tank as necessary. The air trap baffle 28, attached to the side wall 30 of the reservoir tank 24 extends vertically downward to at least the bottom portion 29 of the water outlet pipe 22.

It will be further observed that the slurry inlet pipe 18 enters reservoir tank 24 through the side wall 30 thereof into the interior of the tank 24. The inlet pipe 18 then bends upwardly at an angle of approximately 90° as shown. The inlet pipe 18 is in fluid communication with the dryer section 14.

A moist air discharge port 31 exits the reservoir tank 24 through the side wall 30 thereof. FIG. 2 illustrates the use of a moist air discharge pipe 35 to further direct the moist air 49 out of the water recovery tank 24. A fan 32 placed on the moist air discharge pipe 35 may be used to enhance the moist air flow. A moist air discharge baffle 33 is shown disposed and fixedly attached near the point where the moist air discharge pipe 31 exists the reservoir tank 24. The moist air discharge baffle 33 directs liquid water spray away from the moist air discharge port.

The basic structure of the reservoir section 12 having been described, the dryer section 14 will now be discussed. It will be observed that the dryer section 14 comprises a cylindrically configured canister 34, the canister having a lower end 13, a perforated bottom pan 36 disposed at the lower end of the canister 13, with water discharge holes interspersed therethrough, an inwardly disposed perforated screen 37, and a product discharge housing 38. The inner surface 40 of the canister 34 and the outer surface 42 of the screen 37 are spaced apart to define a tubular shaped volume 44. The canister 34 and the screen 37 each define a longitudinal axis, the axes thereof being substantially co-linear. As will be discussed in greater detail below, the perforated surface bottom pan 36 forms a floor beneath the tubular volume space 44 at the bottommost end of the dryer canister 34 to allow water released from the material to flow downwardly and into the water recovery tank. The dryer section 14 may be hingedly attached to the reservoir tank 24 of the reservoir section 12 by hinges 11 as illustrated in FIG. 1. The hinged connection allows the dryer section 14 to be hingedly rotated away from the reservoir section for ease of cleaning and other maintenance.

A rotor 46 defining an axis of rotation is suspended within the interior of the perforated screen 37. Rotor 46 comprises an elongate, tubular shaped rotor pipe 48, the rotor having an axis substantially co-linear with the screen 37. A plurality of rows of blades 50 are fixedly attached to the rotor pipe 48 in a known manner, such as by welding. A plurality of kickers 52 extend the length of the rotor pipe 48. The rotor 46 has a lower end 54.

The upper end of the dryer section 14 and the motor section 16 will be described. A product discharge housing 38 is attached in a known manner, such as welding, to the uppermost end of the dryer canister 34 as illustrated in FIG. 1. The product discharge housing 38, together with the top portion of the dryer canister 34 define a volume 39 into which the upper end of the rotor 46 extends. The uppermost end of the rotor pipe 48 is attached to a rotor top plate not shown in the Figures by any known manner such as welding or bolting. A plurality of scraper blades also not shown are attached thereto to assist in urging the dried product into the product discharge chute 20. The motor 17 is drivingly connected with the rotor 46 in a manner known in the art. FIG. 2 further illustrates a forced dry air input conduit 45 that is in fluid communication with the product discharge chute 20, the volume 39 within the product discharge housing, and the tubular volume 44 within the dryer canister 34. U.S. Pat. No. 5,987,769 to Hauch, et al., incorporated herein by reference, provides further detail regarding the upper end of the dryer section 14 and the motor section 16.

With the foregoing description of the present invention, its operation can now be fully explained.

Addition of moisture-laden product to the dryer 10 begins with the feeding of slurry through the inlet pipe 18 into the reservoir section 12 and upwardly into the dryer section 14. The slurry, as noted, will comprise a desired end product and a fluid, most often water. The slurry will engage the rotor blades 50, which will "throw" or force the slurry outwardly and upwardly against the perforated screen 37. As the product strikes the screen 37, the water will be forced therefrom and forced through the apertures in the perforated screen 37 into the volume 44 by the centrifugal action of the water that is created by the rotating rotor 46. Once the water has entered the volume 44 through the perforations in the screen 37 it will fall downwardly within the volume 44 through the water discharge holes in the perforated bottom pan 36 and thus into the reservoir tank 24 of the reservoir section 12. The moist air discharge baffle 33 directs the water spray away from the moist air discharge port 31. The dry air beint forced into the dryer 10 aids in directing released water downwardly through the perforated bottom pan 36 of the dryer section and into the reservoir section 12 instead of spraying back through the perforated screen 37 where it may re-moisten the product.

The water 26 in the tank 24 will flow from the tank via the discharge 22 and can be recirculated or treated as necessary before discharge into the appropriate water treatment or sanitary sewer system. The air trap baffle 28 mounted near the water outlet pipe 22, ensures that the airflow is downwardly through the dryer by not allowing airflow to come from the water outlet pipe 22.

The product, which may as previously noted, comprise raw plastic beads or spherules will be forced upward through the rotating action of the blades 50 attached to the rotor pipe 48. The product will alternately be forced against the screen 37 and bounce off of it back towards the rotor pipe 48. In this manner, then, the beads, or other product appropriate for drying with an invention such as that described herein, are "bounced" upwards inside the screen 37 until the product reaches the volume 39 created in the product discharge housing 38. As the product passes upward into the volume 39 through the opening the product is by known mechanisms forced out of the dryer section 14 through the product discharge chute 20 into the appropriate receiving facility.

Concurrent with the commencement of processing of the slurry 15, forced dry air 47 is added to the dryer through the dry air input conduit 45. Generally, the moisture content of the dry air for this purpose is in the range of 0.1% moisture content or less. This dry air may be at ambient temperature or pre-heated depending on the particular product undergoing drying. Introduction of the dry air 47 then results in dry airflow through the product discharge conduit 20, into the volume in the product discharge housing 39, downwardly through the tubular volume 44 created between the screen 37 and the inner surface of the dryer section canister 40, through the water discharge holes in the perforated bottom pan 36 and then discharged though the moist air discharge port 31. The initially dry air works to remove moisture from the moist product as the air flows past the product traveling in a direction that is essentially opposite that of the product. The air is forced through the product discharge chute 20, downwardly through the dryer section 14, into the reservoir section and ultimately removed. Thus, the air is moist when it is ultimately discharged from the reservoir section. Alternatively, air may be drawn into the dryer 10 through air vents, not shown in the Figures, or other similar structure as opposed to a conduit disposed on the product discharge chute 20. This forced air flow can be assisted by engaging the fan 32 which acts to increase the air flow through the dryer 10 and outwardly through the moist air discharge pipe 35.

The air flow is in the opposite direction of product travel through the dryer 10 and the air is exhausted at the bottom or below the end of the rotor 46, thus providing the product with longer exposure to the dry airflow the known centrifugal dryers. As noted, known centrifugal dryers have a great deal of water spray in the water removal space which results in the reintroduction of water to the product and sustains a relatively high level of humidity in the rotor chamber—in many cases the air is completely saturated with water, making it extremely difficult to effectively remove water from the product. The dry airflow introduced in the present invention captures the water droplets in the volume 44 and forces them downward toward the water reservoir tank 24. This reduces, if not eliminates, the reintroduction of water to the product as a result of water spray in the dryer section 14. In addition, the dry air is continually being pumped into and through the dryer, ensuring a lower humidity level than with known dryers. The result is a more efficient reduction in the moisture content of the product and an improvement in the capacity of the dryer.

The above specification describes certain preferred embodiments of this invention. This specification is in no way intended to limit the scope of the claims. Other modifications, alterations, or substitutions may now suggest themselves to those skilled in the art, all of which are within the spirit and scope of the present invention. It is therefore intended that the present invention be limited only by the scope of the attached claims below:

In the claims:

1. A centrifugal pellet dryer for removing a liquid from a slurry of particles in the liquid, comprising:
    a reservoir section;
    a dryer section; and
    a motor section;
    wherein the dryer section further comprises a conduit for introduction of forced dry air into the dryer and the reservoir section includes a moist air discharge port positioned to allow the air to travel in a direction generally opposite to a direction of movement of said slurry through the dryer section.

2. The dryer of claim 1, wherein the dry air is preheated before introduction into the dryer.

3. A centrifugal pellet dryer, comprising:
    a reservoir section;
    a dryer section; and
    a motor section;
    wherein the dryer section further comprises a conduit for introduction of forced dry air into the dryer, and wherein the dryer section includes a rotor disposed therein, the rotor having a lower end, the dryer further comprising:
        a moist air discharge port disposed in the reservoir section below the lower end of the rotor; and
        a moist air discharge baffle, the baffle fixedly disposed proximally adjacent to and in front of the moist air discharge port.

4. The dryer of claim 3, wherein the reservoir section further comprises a moist air discharge pipe, the pipe fluidly connected to the moist air discharge port.

5. The dryer of claim 4, wherein the reservoir section further comprises a fan, the fan being in fluid communication with the moist air discharge pipe and is further configured to assist in the removal of the forced air.

6. The dryer of claim 5, wherein the reservoir section further comprises:
    a water outlet pipe, the opening of the pipe disposed near the bottom of the reservoir and in fluid communication with the reservoir section;
    a sloped bottom, with an upper level and a lower level, the lower level positioned adjacent the water outlet pipe; and
    an air trap baffle, the baffle fixedly attached proximally adjacent to and in front of the opening of the water outlet pipe.

7. The dryer of claim 1, wherein the dryer section further comprises:
    a canister having a lower end with a perforated bottom pan mounted thereto, the canister further having an inner surface;
    a perforated screen mounted in the canister,
    a rotor, the rotor disposed within the screen, the screen and canister being positioned circularly about the rotor; and
    a volume defined by the space between the inner surface of the canister and the perforated screen.

8. The dryer of claim 1, further comprising the dryer section being hingedly attached to the reservoir section.

9. A centrifugal pellet dryer, comprising:
    a dryer section, wherein the dryer section further comprises
    a canister having a lower end with a perforated bottom pan mounted thereto, the canister further having an inner surface;
    a perforated screen mounted within the canister;
    a rotor having a lower end and disposed within the screen, the screen and canister being positioned circularly about the axis of rotation; and
    a volume defined by the space between the inner surface of the canister and the perforated screen;
    a reservoir section, wherein the reservoir section further comprises
    a moist air discharge port disposed in the reservoir section below the lower end of the rotor, the moist air discharge port in fluid communication with the volume defined by the space between the inner surface of the canister and the perforated screen;
    a moist air discharge baffle, the baffle fixedly disposed proximally adjacent to and in front of the moist air discharge port;
    a moist air discharge pipe, the pipe in fluid communication with the moist air discharge port;
    a fan, the fan being in communication with the moist air discharge pipe and being further configured to assist in the removal of air from the reservoir section;
    a water outlet pipe, the opening of the pipe disposed near the bottom of the reservoir section and in fluid communication with the reservoir section;
    a sloped reservoir section bottom, with an upper level and a lower level, the lower level positioned adjacent the water outlet pipe to facilitate removal of water; and
    an air trap baffle, the baffle fixedly attached proximally adjacent to and in front of the opening of the water outlet pipe, wherein the dryer section is hingedly attached to the reservoir section is hingedly attached to the dryer section; and
    a motor section.

10. A method for increasing the drying efficiency of centrifugal pellet dryers having an inlet pipe and a rotor, the method comprising:
    adding a slurry to the dryer's inlet pipe and processing the slurry generally upwardly through the dryer's rotor;
    forcing dry air into a dryer section of the dryer;
    providing a conduit for the forced dry air to travel downwardly through the dryer section and into a reservoir section; and
    removing the moistened air from the reservoir section.

11. The method of claim 10, further comprising forcing dry air into a product discharge chute of the dryer.

12. The method of claim 10, further comprising facilitating removal of the moistened air from the reservoir section by use of a fan.

13. The method of claim 10, further comprising preheating the dry air before forcing the dry air into the dryer section.

14. A method for increasing the drying efficiency of centrifugal pellet dryers having an inlet pipe and a rotor, comprising:

adding a slurry to the dryer's inlet pipe and processing the slurry through dryer's rotor;

forcing preheated dry air into a product discharge chute of the dryer;

providing a conduit for the forced dry air to travel downwardly through a dryer section and into a reservoir section; and facilitating removal of the moistened air from the reservoir section by a fan.

* * * * *